US006222439B1

(12) United States Patent
Tanigawa et al.

(10) Patent No.: US 6,222,439 B1
(45) **Date of Patent: *Apr. 24, 2001**

(54) CIRCUIT BREAKING DEVICE

(75) Inventors: Mitsuru Tanigawa, Yokkaichi; Yoshiyuki Miyazaki; Akio Matsumaru, both of Nagoya, all of (JP)

(73) Assignees: Sumitomo Wiring Systems, Ltd., Mie; Sumitomo Electric Industries, Ltd., Osaka; Harness System Technologies Research, Ltd., Aichi, all of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,861

(22) Filed: Feb. 11, 1999

(30) Foreign Application Priority Data

Feb. 17, 1998 (JP) .......................................... 10-035107
Feb. 17, 1998 (JP) .......................................... 10-035117

(51) Int. Cl.7 ......................... H01H 37/76; H01H 73/34; B60K 28/10

(52) U.S. Cl. ......................... 337/401; 337/157; 337/403; 361/115; 180/279; 200/61.08

(58) Field of Search ........................... 337/401, 402–405, 337/30, 31, 157; 307/9.1–10.8, 119; 180/271, 274, 279, 281–283; 200/61.08, 150 R; 361/115; 280/727

(56) References Cited

U.S. PATENT DOCUMENTS 3,277,255 * 10/1966 Mattsson et al. ................. 200/61.08
3,873,786 * 3/1975 Lagofun ........................... 200/61.08
3,915,236 * 10/1975 Stichling ............................ 169/61
3,958,206 * 5/1976 Klint .................................. 337/406
4,224,487 * 9/1980 Simonsen ......................... 200/61.08
4,311,890 * 1/1982 Schroder .......................... 200/61.08
4,417,519 * 11/1983 Lutz .................................. 102/263
4,479,105 * 10/1984 Banes .................................. 337/4
4,538,133 * 8/1985 Pflanz .................................. 337/4
5,360,999 * 11/1994 Upshaw et al. ..................... 307/112
5,535,842 * 7/1996 Richter et al. ...................... 180/279
5,877,563 * 3/1999 Krappel et al. ..................... 307/10.1

FOREIGN PATENT DOCUMENTS 8027885 1/1982 (DE) .
3537314 4/1987 (DE) .
4413847 11/1994 (DE) .
297 00 594 U 3/1997 (DE) .
0863528 9/1998 (EP) .
0929090 7/1999 (EP) .
B2-58-47809 10/1983 (JP) .

* cited by examiner

*Primary Examiner*—Leo P. Picard
*Assistant Examiner*—Anatoly Vortman
(74) *Attorney, Agent, or Firm*—Oliff & Berridge, PLC

(57) ABSTRACT

A bus bar is connected between a battery post and a stud bolt to which an electric power supply wire is connected. An opening is provided in a housing in which an explosive sealing portion is accommodated. Just before the opening, a broken portion of the bus bar is provided. In the broken portion, a recess portion is formed, and this portion of the broken portion is thin. On both sides of the broken portion, a cutout portions are formed. In case of emergency, electric current generates in a trigger wire, and an explosive in the explosive sealing portion is exploded. An explosive force is directed to the opening of the housing, and the broken portion located just before the opening receives the explosive force forward. Due to the foregoing, the recess portion is broken and both broken pieces are bent at the cutout portions and opened being separated from each other. In this way, an electric power supply circuit is shut off.

10 Claims, 7 Drawing Sheets

CIRCUIT BREAKING DEVICE

BACKGROUND OF THE INVENTION

1. Field of the Invention

The present invention relates to a circuit breaking device incorporated into an automobile and others.

2. Description of the Related Art

Concerning this type circuit breaking device, it is common to use a fuse or a fusible link incorporated into an electric circuit so that the current flow in the circuit is interrupted when excessive current is generated in the electric circuit. On the other hand, in case of an emergency such as an automobile accident, it is necessary to forcibly shut off the electric circuit in a moment. For example, in an electric power supply circuit of an electric automobile which has come into wide use recently, there is a strong demand for forcibly shutting off the electric circuit in a moment in case of emergency.

As disclosed in Japanese Examined Patent Publication No. 58-47809, the conventional circuit breaker of this type is activated in such a manner that an electric conductor incorporated into an electric circuit is forcibly broken by an explosive force. As shown in FIG. 10, this circuit breaker is composed as follows:

In a reinforced glass case 105, there are provided a fuse 102 connected between output terminals 101, an explosive 103, and a filament 104 for heating this explosive 103. When an electric current generates in the input terminals 106, this filament 104 is heated, so that explosive 103 is exploded. Utilizing the explosive force, the fuse 102 is broken. Due to the above structure, it is possible to forcibly shut off the electric circuit at an arbitrary time.

However, according to the conventional circuit breaker, the following problems may be encountered. The explosive force of explosive is dispersed in all directions, and only one portion of the explosive force acts on the fuse 102. Therefore, a considerably high intensity of explosive force is required for breaking the fuse 102 positively. Therefore, the sealed glass case 105 must have a strong structure so that it can withstand a high intensity of explosive force. Further the sealed glass case 105 must be subjected to a special treatment for enhancing the mechanical strength. Accordingly, the manufacturing cost is inevitably increased. Additionally, the conventional circuit breaker is disadvantageous in that it is not simple to reset the circuit breaker after the fuse 102 has been broken. Thus, after an electric automobile has been involved in an accident, it is impossible to reset the circuit breaker immediately so that the electric automobile can be moved under its own power.

SUMMARY OF THE INVENTION

A circuit breaking device of the present invention has been accomplished in the above circumstances. It is an object of the present invention to provide a circuit breaking device by which the circuit can be positively shut off in case of emergency while an intensity of explosive force is being suppressed. Additionally, it is an object of the present invention to provide a circuit breaking device that can be reset easily for electric connection of the circuit if necessary after an electric conductor in the circuit has been broken.

As means for achieving the above object, according to a first aspect of the present invention, there is a feature that a circuit breaking device comprises a housing for accommodating an explosive exploding in response to a trigger signal, the housing having an opening for directing an explosive force in one direction, and an electric conductor to be broken by the explosive force of the explosive, the electric conductor provided on the way of a circuit, wherein the electric conductor is provided opposed to the opening, and an easy broken portion for facilitating a breaking of the electric conductor is formed on the electric conductor.

When the explosive is exploded in response to a trigger signal, its explosive force is directed to the opening of the housing, and the electric conductor provided at a position opposed to the opening receives the explosive force. Due to the foregoing, the easy broken portion is broken and the electric circuit is shut off.

The explosive force of explosive is directed to one direction, and the electric conductor is provided at a position where the explosive force can be effectively received, and further the easy broken portion is provided in the electric conductor so that the breaking of the electric conductor can be facilitated. Accordingly, even if an intensity of the explosive force is low, the electric conductor can be positively broken.

According to a second aspect of the present invention, there is a feature that, in the circuit breaking device according to a first aspect of the present invention, the easy broken portion is formed by cutting out the electric conductor so that a thickness can be thinned.

Since the electric conductor is cut out so that the thickness can be thinned in the cutout portion, it can be easily broken.

According to a third aspect of the present invention, there is a feature that, in the circuit breaking device according to a first aspect of the present invention, a cutout portion for facilitating a broken piece to be opened when the electric conductor is broken at the easy broken portion is provided on a side of the easy broken portion of the electric conductor.

The easy broken portion of the electric conductor is broken by the explosive force of explosive. At the same time, the broken pieces are opened while they are bent at the cutout portions. Therefore, the broken pieces of the broken portion are positively prevented from coming into contact with each other after the electric conductor has been broken.

According to a fourth aspect of the present invention, there is a feature that, in the circuit breaking device according to a first aspect of the present invention, a restricting wall for restricting a movement of the housing is provided on one side of the opening is formed and opposite side of the opening is formed.

When the explosive has exploded, the housing is prevented from retracting by the restricting wall. Therefore, the explosive force is intensely collected in the opening.

According to a fifth aspect of the present invention, there is a feature that, in the circuit breaking device according to a first aspect of the present invention, the device further comprises a resetting electric conductor by which both sides of a broken portion of the electric conductor can be reconnected to each other after the electric conductor has been broken.

After the electric conductor has been broken and the flow of current in the circuit has been interrupted, the resetting electric conductor is connected to both sides of the broken portion of the electric conductor. Thus, the circuit can be electrically connected again.

According to a sixth aspect of the present invention, there is a feature that, in the circuit breaking device according to a fifth aspect of the present invention, a lid is attached to a case, the resetting electric conductor is provided on the lid, the resetting electric conductor is not contacted with the electric conductor in the case when the lid is normally attached to the case, and the resetting electric conductor is contacted with both sides of the broken portion of the electric conductor when the lid is shifted from a normal position.

In the normal operating condition, the resetting electric conductor is not contacted with the electric conductor. Therefore, when the electric conductor is broken by an explosive force, the circuit is shut off. After that, when the lid-is shifted and the resetting electric conductor is connected to both sides of the broken portion of the electric conductor, the circuit is electrically connected again. Since the resetting electric conductor is provided on the lid, it is easy to handle it.

According to a seventh aspect of the present invention, there is a feature that, in the circuit breaking device according to a sixth aspect of the present invention, the case is provided with a display section for displaying a resetting state of the device for electrical connection at a position capable of being visually checked from the outside when the lid is moved for resetting the device for electrical connection.

When the lid is moved to reset the circuit breaking device for electric connection, the display provided on the case is exposed so that it can be visually checked. Accordingly, it is possible to make sure that the circuit breaking device has been reset for electric connection.

The present disclosure relates to the subject matter contained in Japanese patent application Nos. Hei. 10-35117 (filed on Feb. 17, 1998) and Hei. 10-35107 (filed on Feb. 17, 1998) which are expressly incorporated herein by reference in its entirely.

DETAILED DESCRIPTION OF THE PREFERRED EMBODIMENTS

Embodiments in which the present invention is applied to an electric power supply circuit of an electric automobile will be described with reference to the accompanying drawings.

<First Embodiment>

A first embodiment of the present invention will be described with reference to FIG. 1 to FIG. 3.

Figure 3:
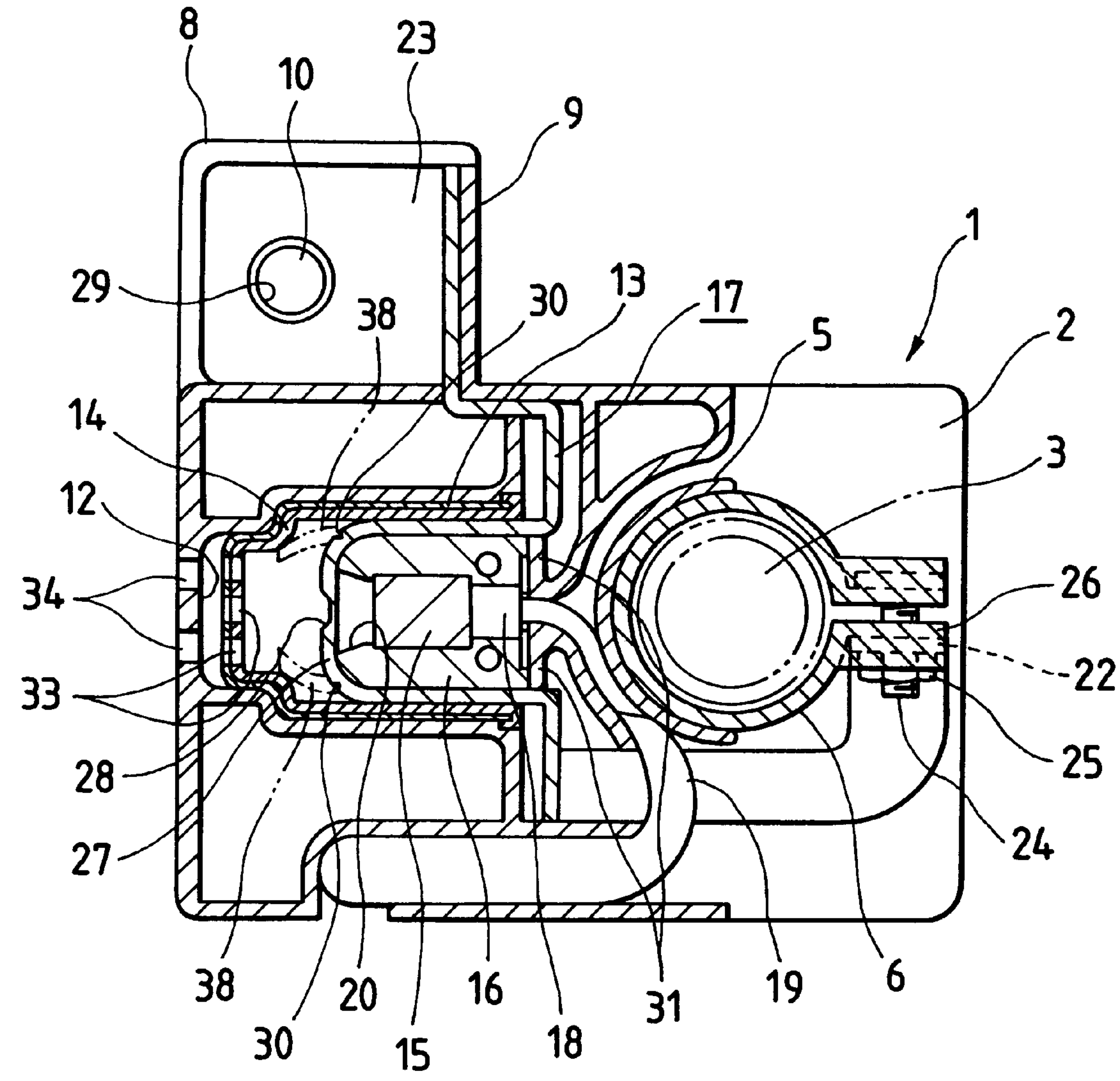
FIG. 3 is a partially cutout plan view of the first embodiment.

In the drawings, reference numeral 1 represents a lower case which is made of synthetic resin and has such a plane outer shape of which is a rectangular base plate 2 having a protruding portion 8 provided to a left end of an upper edge portion of the rectangular base plate 2 as shown in FIG. 3. On the base plate 2 in the right region of the rectangular lower case 1, there is formed an insertion hole 4 into which a battery post 3 (shown by a chain line in FIG. 3) of a battery (not shown) mounted on an electric automobile is inserted. At an edge inside the insertion hole 4, there is provided a substantially semicircular wall 5 which is vertically attached to the lower case 1. It is possible to connect a fastening ring 6 made of an electric conductor on the insertion hole 4.

In the left region of the rectangular lower case 1, there is provided a peripheral wall 7 which is formed in the periphery of the left region. At the center of the left region, there is provided an accommodation chamber 12 for accommodating a casing 13 described later. In the protruding portion 8, there is provided a side wall 9 which is vertically attached to the right edge of the protruding portion 8. In the protruding portion 8, there is provided a stud bolt 10 for connecting an electric power supply wire not shown in the drawing.

The above accommodation chamber 12 is formed in such a manner that the width of the forward end portion (the left in FIG. 3) is more narrow than the width of the rear end portion (the right in FIG. 5); and the casing 13 is accommodated in this-accommodation chamber 12. The casing 13 is made of stainless steel or the like and formed into a box shape so that it can be tightly accommodated in the accommodation chamber 12 while a predetermined clearance is provided on the forward end side. In the casing 13, there is provided an insulating case 14 in such a manner that the insulating case 14 covers the forward end side, upper side, lower side, right and left of the inside of the casing 13. In the casing 13, there is provided a housing 16 in which an explosive sealing portion 15 is accommodated, and also there is provided one portion of a bus bar 17 which corresponds to an electric conductor of the present invention.

The explosive sealing portion 15 is composed in such a manner that the explosive is filled around a filament and enclosed in the sealing portion. On the base end side of the explosive sealing portion 15, there is provided a connecting body 18 for connecting the filament with a trigger wire 19 connected with the battery. The housing 16 is made of synthetic resin and formed into a block shape. Inside the housing 16 on the base end side, the explosive sealing portion 15 and the connecting body 18 are accommodated. On the forward end surface of the housing 16, there is formed an opening 20 which reaches the explosive sealing portion 15.

Figure 1:
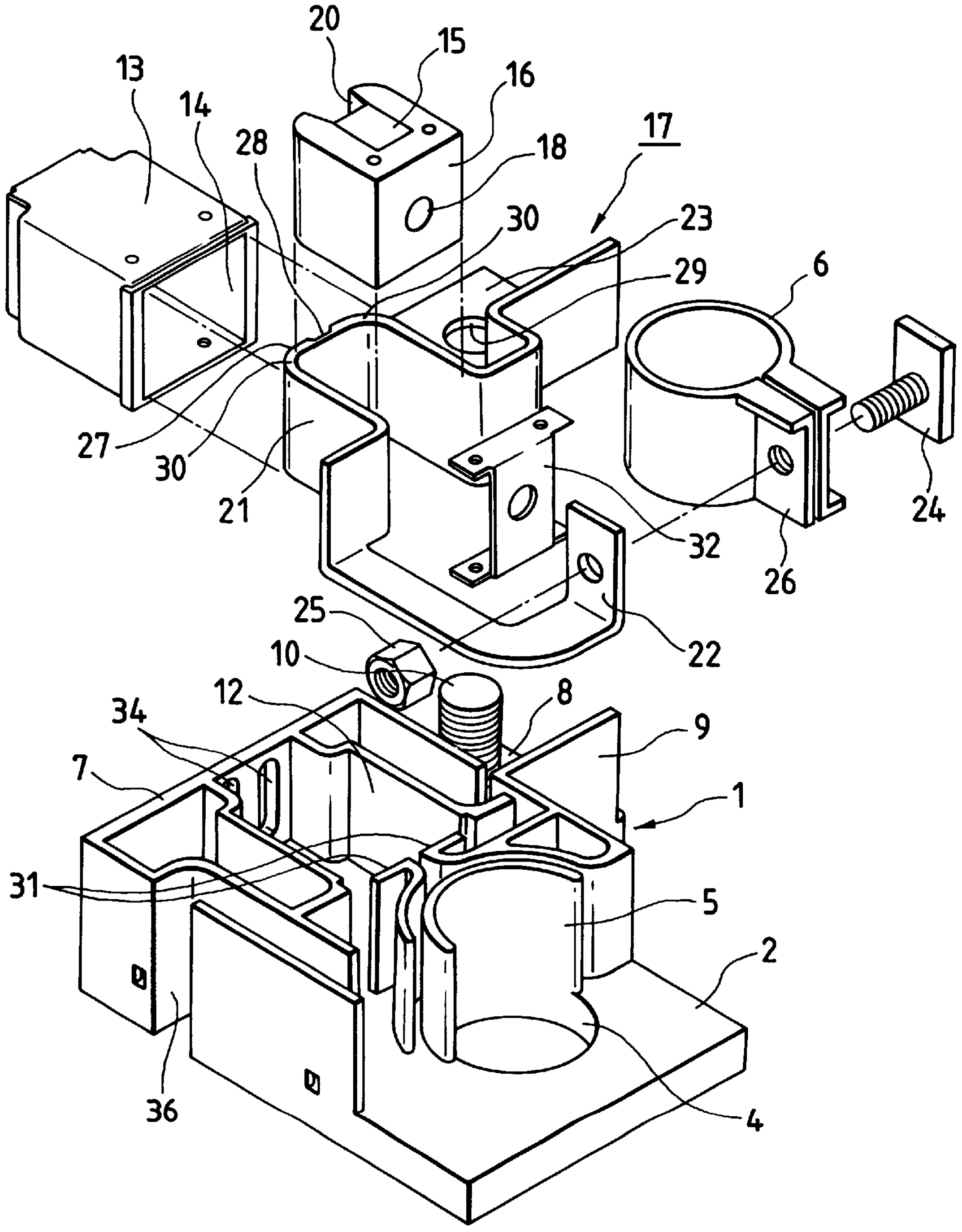
FIG. 1 is an exploded perspective view of the first embodiment of the present invention.
Figure 2:
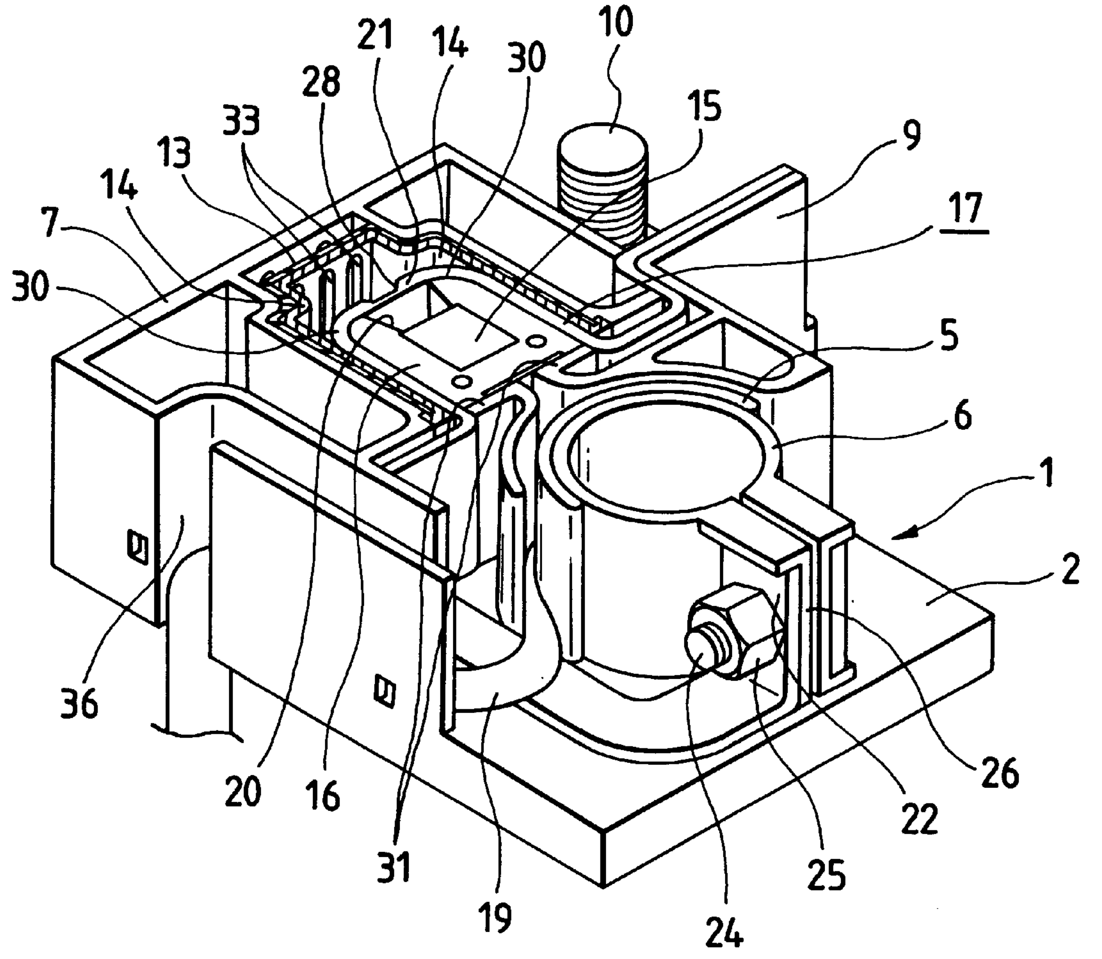
FIG. 2 is a partially cutout perspective view of the first embodiment.

The bus bar 17 is made of, for example, copper alloy or the like and formed into a U-shaped portion 21 which covers the forward end surface and both sides of the housing 16 as shown in FIG. 1. One end side (the viewer's side in FIG. 1) of the U-shaped portion 21 is bent outside at a right angle and an L-shaped portion is extended from the lower edge. A first connecting portion 22 is raised at the forward end of the extended L-shaped portion. This first connecting portion 22 can be fastened with a connecting plate 26 of the fasten ring 6 by a bolt 24 and a nut 25. The other end side of the U-shaped portion 21 is bent outside by a right angle in the same manner and bent twice to the forward end side and outside. At the lower edge of U-shaped portion directed outside, there is horizontally provided a second connecting portion 23 in which an attaching hole 29 is formed. While the stud bolt 10 is inserted into this second connecting section 23, this second connecting section 23 can be disposed on the protruding portion 8.

In the forward end portion, which will be referred to as a broken portion 27 hereinafter, of the U-shaped portion 21 of the bus bar 17, a recess portion 28 is formed all over the width on the outside at the center in the longitudinal direction. On the outside of both corner portions (both ends of the broken portion 27) of the U-shaped portion 21, cutout portions 30 are formed all over the width in the same manner.

An example of the assembling procedure will be described as follows:

While the explosive sealing portion 15 and the connecting body 18 are combined with each other, they are accommodated on the base end side of the housing 16. This housing 16 is engaged with the inside of the U-shaped portion 21 of the bus bar 17. Due to the foregoing, a portion of the bus bar 17 in which the recess portion 28 of the broken portion 27 is provided, which corresponds to the easy broken portion of the present invention, is located just before the opening 20 of the housing 16. After that, the casing 13 is engaged with the outside of the U-shaped portion 21 of the bus bar 17. When a rear plate 32 is set and caulked, these parts are fixed. This casing 13 is engaged in the accommodation chamber 12 of the lower case 1 together with the bus bar 17. In this assemblage, the rear surface of the housing 16 comes into contact with a restricting wall 31 raised from the lower case 1. On the forward end surface of the casing 13 and on the forward end surface of the insulating case 14, there is formed a vent hole 33 from which a blast of explosion is released, and also on the outer surface of the accommodation chamber 12, there is formed a vent hole 34 from which a blast of explosion is released.

The first connecting portion 22 of the bus bar 17 is located close to the insertion hole 4 of the battery post 3 and provisionally assembled to the connecting plate 26 of the fasten ring 6 by the bolt 24 and the nut 25. Concerning the second connecting section 23, while the stud bolt 10 is inserted into the attaching hole 29 of the second connecting section 23, the second connecting section 23 is disposed on the protruding portion 8. A trigger wire 19 drawn out from the housing 16 is engaged in a guide groove 36 which is formed around the insertion hole 4 and along the peripheral wall 7. Then the trigger wire 19 is drawn outside.

When the battery post 3 is inserted into the insertion hole 4 and the fastening ring 6, the lower case 1 assembled in the above manner is disposed on an upper surface of the battery. Then, the bolt 24 and the nut 25 are fastened. Due to the foregoing, the fastening ring 6 is diminished in diameter, so that the fasten ring 6 can be fixed to the battery post 3. At the same time, the battery post 3 and the first connecting section 22 of the bus bar 17 are connected with each other by the fastening ring 6. A connecting terminal of an electric power supply wire (not shown) is connected to the stud bolt 10 and pressed and fixed to the second connecting section 23 by a nut (not shown). Due to the foregoing, an electric power supply circuit can be formed from the battery to the electric power supply wire through the bus bar 17. A trigger wire 19 is also connected to the battery side. Finally, an upper case (not shown), the shape of which is like a lid, is set and fixed onto an upper surface of the lower case 1.

The structure of the first embodiment of the invention is described above. Successively, operation of the first embodiment is described as follows:

When an emergency signal is sent out due to the occurrence of an automobile accident, electric current generates in the trigger wire 19. Therefore, the filament in the is explosive sealing portion 15 is heated, and explosive is exploded. Since the rear surface of the housing 16 is received by the restricting wall 31 so that the housing 16 can not be retracted, explosive force is mainly directed to the opening 20 of the housing 16. Therefore, the broken portion 27 of the bus bar 17 opposed to the opening 20 receives the explosive force. Accordingly, as shown by the chain line in FIG. 3, the recess portion 28 of the bus bar 17 is broken. In this case, both broken pieces 38 are bent at the cutout portions 30 and opened so that they are separated from each other. Due to the foregoing, the electric power supply circuit is shutoff. In this connection, blast of explosion is released outside from the vent holes 33, 34.

In this first embodiment, the explosive force is directed from the opening 20 of the housing 16 in one direction, the broken portion 27 of the bus bar 17 is provided at a position where the explosive force can be effectively received, and further the recess portion 28 for facilitating the break is provided in the broken portion 27. Accordingly, even if an intensity of the explosive force is relatively low, the broken portion 27 can be positively broken. Additionally, the structure of the housing 16 or the like can be relatively simplified.

Simultaneously when the broken portion 27 is broken, the broken pieces are opened while they are bent at the cutout portions 30 by the explosive force. Accordingly, the broken pieces of the broken portion 27 are positively prevented from coming into contact with each other again. When both broken pieces 38 are opened, there is a possibility that forward end portions of the broken pieces 38 come into contact with the inside of the casing 13. However, since the inside of the casing 13 in the contacting portion is provided with the insulating case 14. Consequently, there is no possibility that the bus bar 17 is electrically connected.

Since the bus bar 17 provided with the broken portion 27 is directly connected to the battery post 3, the structure can be simplified and the space can be saved as compared with a case in which a broken conductor is provided on the way of the electric power supply wire drawn out from the battery post 3.

<Second Embodiment>

A second embodiment of the present invention will be described with reference to FIG. 4 to FIG. 7.

Figure 4:
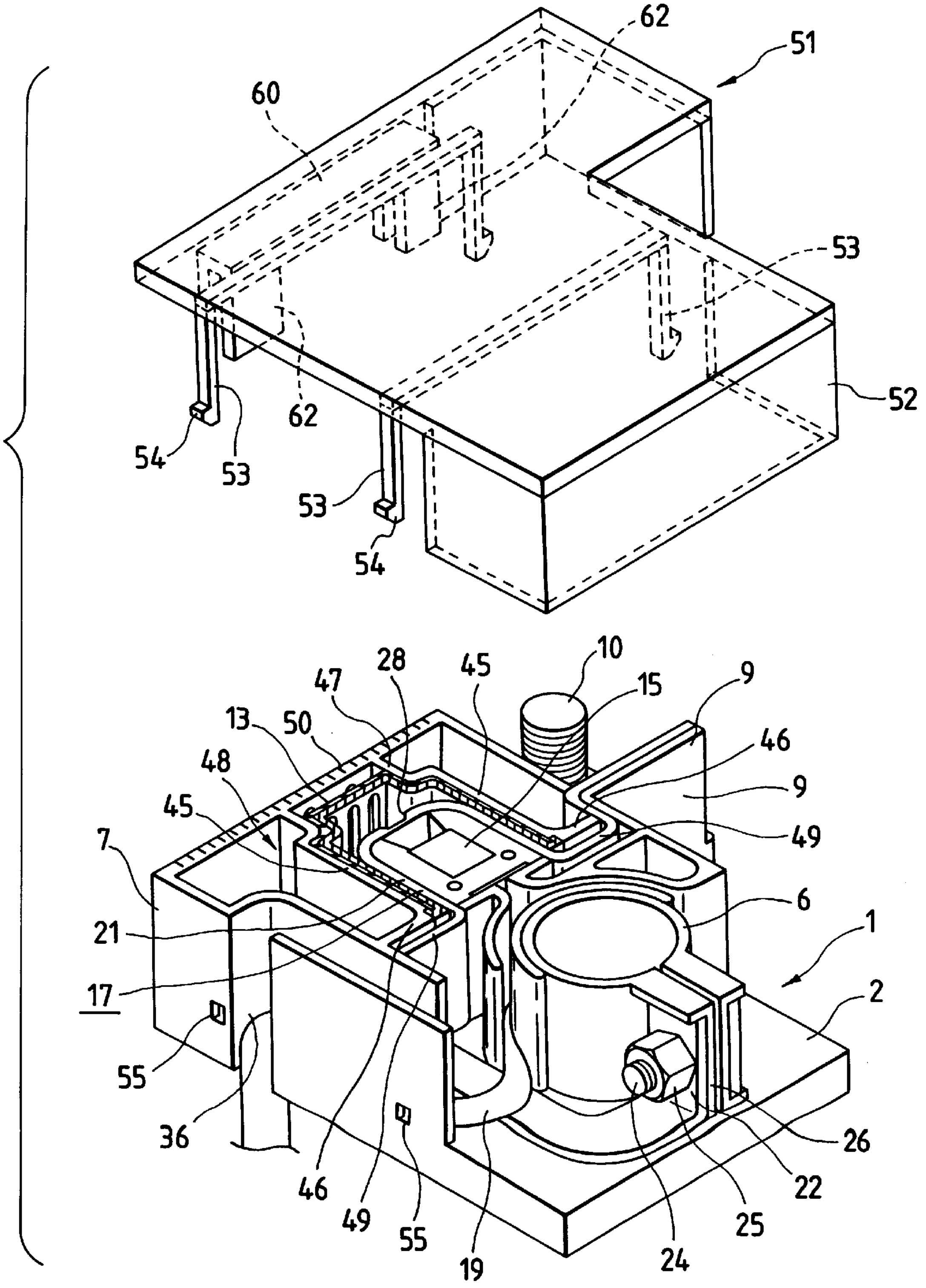
FIG. 4 is a partially cutout exploded perspective view of the second embodiment of the present invention.
Figure 5:
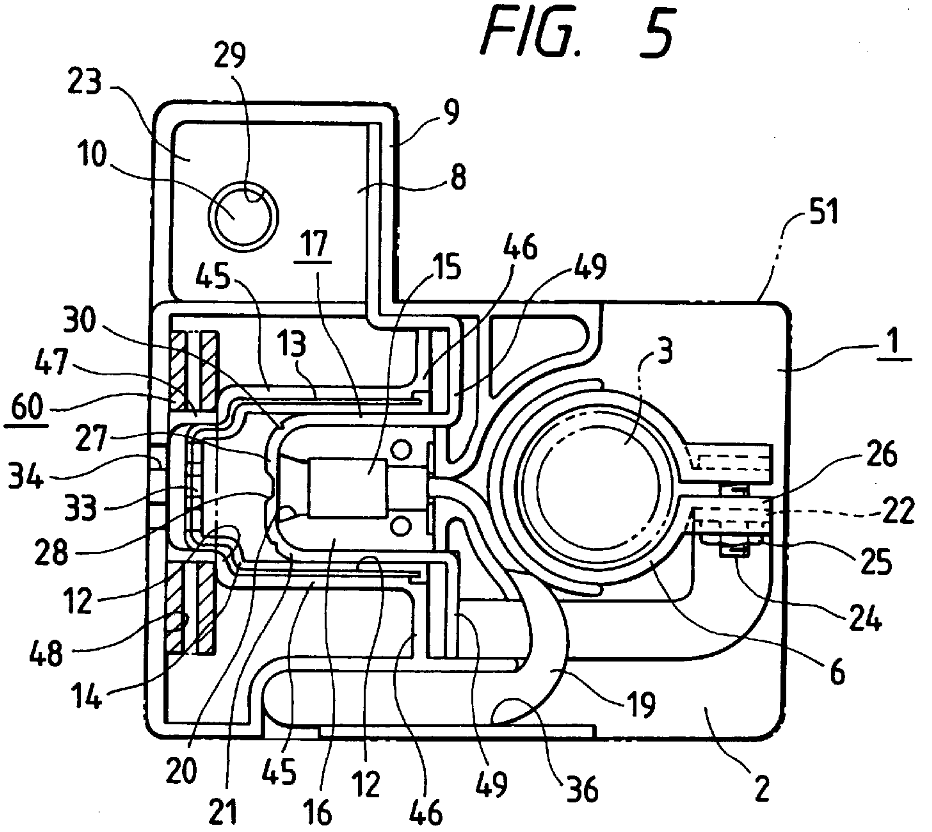
FIG. 5 is a partially cutout plan view of the second embodiment of the present invention.

In FIGS. 4 and 5, reference numeral 1 is the lower case which is made of synthetic resin and has such a plane outer shape of which is the rectangular base plate 2 having the protruding portion 8 provided to a left end of an upper edge portion of the rectangular base plate 2 as shown in FIG. 5. On the base plate 2 in the right region of the rectangular lower case 1, there is formed an insertion hole into which the battery post 3 of a battery (not shown) mounted on an electric automobile is inserted. The fastening ring 6 made of an electric conductor can be set above the insertion hole. In the protruding portion 8, there is provided the side wall 9 which is vertically attached to the right edge of the protruding portion 8. In the protruding portion 8, there is provided the stud bolt 10 for connecting an electric power supply wire not shown in the drawing.

In the left region of the rectangular lower case 1, there is provided the peripheral wall 7 which is formed in the periphery of the left region. The right end of the peripheral wall 7 extends to a position close to the center of the fastening ring 6. At the center on the left of the peripheral wall 7 in the longitudinal direction, there is formed the accommodation chamber 12 partitioned by the partition walls 45, 45. Right ends of both partition walls 45 are respectively bent outside at a right angle, so that auxiliary walls 46 are formed at the right ends. The above accommodation chamber 12 is formed in such a manner that the width of the forward end portion (the left in FIG. 5) is more narrow than the width of the rear end portion (the right in FIG. 5); and the casing 13 is accommodated in this accommodation chamber 12. On both sides of the portion in which a narrow width portion 47 is formed, there is provided an accommodating space 48 for accommodating a spare bus bar 60 described later which corresponds to a resetting electric conductor of the present invention.

The casing 13 is made of stainless steel or the like and formed into a box shape so that it can be tightly accommodated in the accommodation chamber 12 while a predetermined clearance is provided on the forward end side. In the casing 13, there is provided an insulating case 14 in such a manner that the insulating case 14 covers the forward end side, upper side, lower side, right and left of the inside of the casing 13. In the casing 13, there is provided a housing 16 in which an explosive sealing portion 15 is accommodated, and also there is provided one portion of the bus bar 17 which corresponds to an electric conductor of the present invention.

The explosive sealing portion 15 is composed in such a manner that explosive is filled around a filament and enclosed in the sealing portion. The housing 16 is made of synthetic resin and formed into a block shape. On the forward end surface of the housing 16, there is formed an opening 20 which reaches the explosive sealing portion 15.

The bus bar 17 is made of, for example, copper alloy or the like and formed into the U-shaped portion 21 which covers the forward end surface and both sides of the housing 16. On one end side (lower side in FIG. 2) of the U-shaped portion 21, there is provided a resetting portion 49 which is bent outside at a right angle. This resetting portion 49 is provided along the auxiliary wall 46 in such a manner that a predetermined clearance is provided between the resetting portion 49 and the auxiliary wall 46. An L-shaped portion extending from the lower edge of the resetting portion 49 is provided on the base plate 2. At the forward end of the L-shaped portion, the first connecting portion 22 is formed being raised. This first connecting portion 22 can be connected with a connecting plate 26 of the fasten ring 6 by the bolt 24 and the nut 25.

The other end side of the U-shaped portion 21 is bent outside by a right angle in the same manner, so that the resetting portion 49 is formed. In the same manner, this resetting portion 49 is provided along the auxiliary wall 46 in such a manner that a predetermined clearance is provided between the resetting portion 49 and the auxiliary wall 46. The other end side of the U-shaped portion 21 is bent twice to the forward end side and outside. At the lower edge of U-shaped portion 21 directed outside, there is horizontally provided the second connecting portion 23 in which the attaching hole 29 is formed. While the stud bolt 10 is inserted into this second connecting section 23, this second connecting section 23 can be disposed on the protruding portion 8.

In the forward end piece portion, which will be referred to as the broken portion 27 hereinafter, of the U-shaped portion 21 of the bus bar 17, the recess portion 28 is formed all over the width on the outside at the center in the longitudinal direction. On the outside of both corner portions (both ends of the broken portion 27) of the U-shaped portion 21, cutout portions 30 are formed all over the width in the same manner.

As shown in FIG. 4, there is provided a lid 51 for covering an upper surface of the lower case 1. This lid 51 is made of synthetic resin and formed into a plane which covers all the upper surf ace of the lower case 1. In portions where the peripheral wall 7 of the lower case 1 or the side wall 9 are not provided, a peripheral wall 52 is formed on the lid 51.

On a lower surface of the lid 51, there are provided four engaging pieces 53, which extend downward, capable of entering the inside of the peripheral wall 7 of the lower case 1. Each engaging piece 53 can be bent to the inside respectively, and a protrusion 54 is formed outward at a lower end portion of each engaging piece 53. On the other hand, on the peripheral wall 7 of the lower case 1, there are formed engaging holes 55 capable of engaging with the protrusions 54 of the engaging pieces 53. Accordingly, when the lid 51 is provisionally assembled, each engaging piece 53 is pushed inside the peripheral wall 7 being bent inward. Next, when the lid 51 is assembled at a predetermined position, the engaging piece 53 returns to its original shape, so that the protrusion 54 can be engaged with the corresponding engaging hole 55, and the lid 51 is fixed.

As shown the left in FIG. 4, on an upper surface of the forward end portion of the peripheral wall 7 of the lower case 1, there is provided a display section 50 on which a pattern of stripes are formed.

Figure 7:
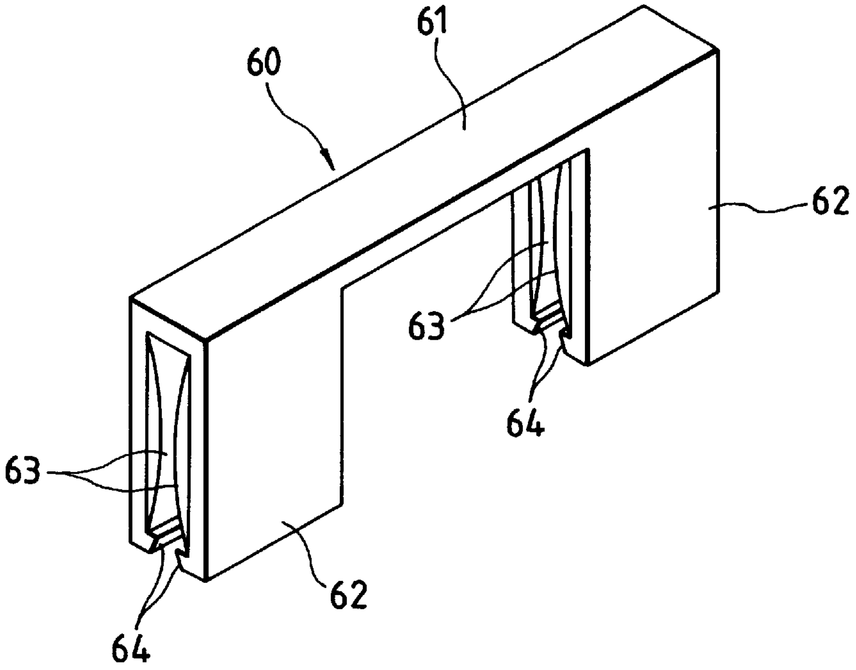
FIG. 7 is a perspective view of a spare bus bar.

On a lower surface of the lid 51 on the left edge side of FIG. 4, the aforementioned spare bus bar 60 is fixed. This spare bus bar 60 is made of the same copper metal or the like as that of the bus bar. As shown in FIG. 7, this spare bus bar 60 has inserting portions 62 which branches into two. These inserting portions 62 are formed on the lower side surface of both ends of a straight connecting portion 61. An interval between both inserting portions 62 is determined in such a manner that the narrow width portion 47 of the partition wall 45 composing the accommodating chamber 12 and the base end side of the U-shaped portion 21 of the bus bar 17 can be interposed between both inserting portions 62. The resetting portion 49 of the bus bar 17 can be inserted into the inserting portion 62. On the inner surfaces of the inserting portion 62 which are opposed to each other, there is provided a louver 63 made of conductive material of low resistance, and this louver 63 elastically bulges inward. Further, lower ends of the inner surfaces of the inserting portion 62, which are opposed to each other, are chamfered for the purpose of guiding, therefore the chamfered portion 64 are formed. The connecting portion 61 is made to attach onto the lower surface of the lid 51 and fixed.

An example of the assembling procedure will be described as follows:

The explosive sealing portion 15 is accommodated on the base end side of the housing 16. This housing 16 is engaged with the inside of the U-shaped portion 21 of the bus bar 17. Due to the foregoing, a portion of the bus bar 17 in which the recess 28 of the broken portion 27 is provided is located just before the opening 20 of the housing 16. After that, the casing 13 is engaged with the outside of the U-shaped portion 21 of the bus bar 17. This casing 13 is engaged in the accommodation chamber 12 of the lower case 1 together with the bus bar 17. On the forward end surface of the casing 13, there is formed the vent hole 33 from which a blast of explosion is released, and also on the outer surface of the accommodation chamber 12, there is formed the vent hole 34 from which a blast of explosion is released.

The first connecting portion 22 of the bus bar 17 is located close to the battery post 3 and provisionally assembled to the connecting plate 26 of the fasten ring 6 by the bolt 24 and the nut 25. Concerning the second connecting section 23, while the stud bolt 10 is inserted into the attaching hole 29 of the second connecting section 23, the second connecting section 23 is dispose on the protruding portion 8. A trigger wire 19, which is connected with the explosive sealing portion 15 and drawn out from the housing 16, is engaged in the guide groove 36 which is formed around the fastening ring 6 and along the peripheral wall 7. Then the trigger wire 19 is drawn outside.

When the battery post 3 is inserted into the insertion hole and the fastening ring 6, the lower case 1 assembled in the above manner is dispose on an upper surface of the battery. Then, the bolt 24 and the nut 25 are fastened. Due to the foregoing, the fastening ring 6 is diminished in diameter, so that the fasten ring 6 can be fixed to the battery post 3. At the same time, the battery post 3 and the first connecting section 22 of the bus bar 17 are connected with each other by the fastening ring 6. A connecting terminal of an electric power supply wire (not shown) is connected to the stud bolt 10 and pressed and fixed to the second connecting section 23 by a nut (not shown). Due to the foregoing, an electric power supply circuit can be formed from the battery to the electric power supply wire through the bus bar 17. The trigger wire 19 is also connected to the battery side.

Finally, the lid 51 is disposed and fixed onto an upper surface of the lower case 1. At this time, the spare bus bar 60 provided on the lower surface of the lid 51 is accommodated in the accommodating space 48 as shown in FIG. 5 while the narrow width portion 47 of the accommodating chamber 12 is interposed between the spare bus bar 60. In this case, the spare bus bar 60 is not contacted with the bus bar 17, therefore the spare bus bar 60 is non-conductive state with the bus bar 17, and the display section 50 is hidden by the lid 51.

Figure 6:
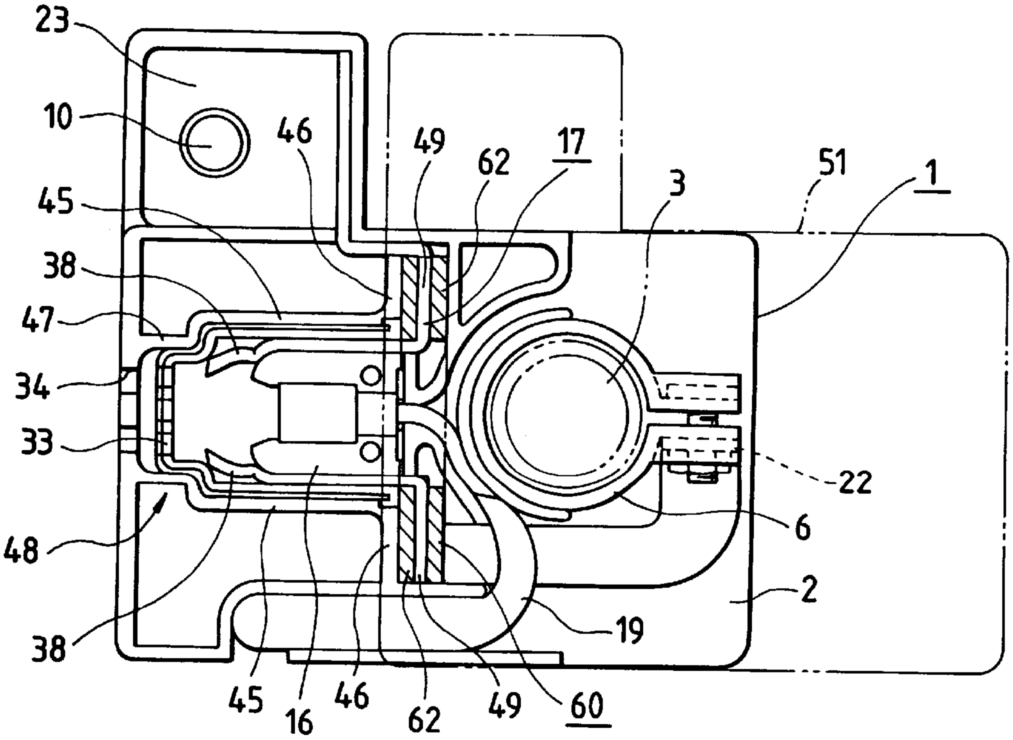
FIG. 6 is a partially cutout plan view in a state in which the circuit is reset so that the circuit can be electrically connected.

Successively, operation of this second embodiment will be described as follows:

When an emergency signal is sent out due to the occurrence of an automobile accident, electric current generates in the trigger wire 19. Therefore, the filament in the explosive sealing portion 15 is heated, and the explosive is exploded. Explosive force is mainly directed to the opening of the housing 16. Therefore, the broken portion 27 of the bus bar 17 opposed to the opening 20 receives the explosive force. Accordingly, as shown in FIG. 6, the recess portion 28 of the bus bar 17 is broken. In this case, both broken pieces 38 are bent at the cutout portions 30 and opened so that they are separated from each other. Due to the foregoing, the electric power supply circuit is shut off. In this connection, a blast of explosion is released outside from the vent holes 33, 34.

In some cases, after the electric power supply circuit has been shut off, it becomes necessary for the vehicle to be moved. In this case, operation is conducted as follows:

First, the protrusions 54 engaged in the engaging holes 55 are pushed inward so as to release the engagement, and then the lid 51 is lifted upward and released from the peripheral walls. Next, the lid 51 is shifted from the normal setting position to the right as shown by a chain line in FIG. 6. Then, the lid 51 is assembled while both the inserting portions 62 of the spare bus bar 60 are being inserted into both the resetting portions 49 of the bus bar 17 which was broken. Then both the resetting portions 49 of the broken bus bar 17 are connected with each other by the spare bus bar 60 by the louver 63 of low resistance. Due to the foregoing, the electric power supply circuit can be electrically connected again.

At this time, the display section 50 provided on the peripheral wall 7 of the lower case 1 is exposed. Therefore, when this display section 50 is visually checked, it is possible to make sure that the electric power supply circuit has been electrically connected again.

As described above, according to this second embodiment, after the electric power supply circuit has been shut off by the break of the bus bar 17, the lid 51 is disassembled once and the spare bus bar 60 fixed on the lid 51 is inserted into both the resetting portions 49 of the broken bus bar 17. Due to the above simple operation, it is possible to quickly reset the electric power supply circuit for electric connection.

Since the spare bus bar 60 is fixed onto the lid 51, it is unnecessary for an operator to search the spare bus bar 60 in case of emergency. Therefore, this circuit breaking device is handy. Usually, the spare bus bar 60 is accommodated in a surplus space (accommodating space 48) in the lower case 1. Therefore, the size of the entire case is not increased.

<Third Embodiment>

Figure 8:
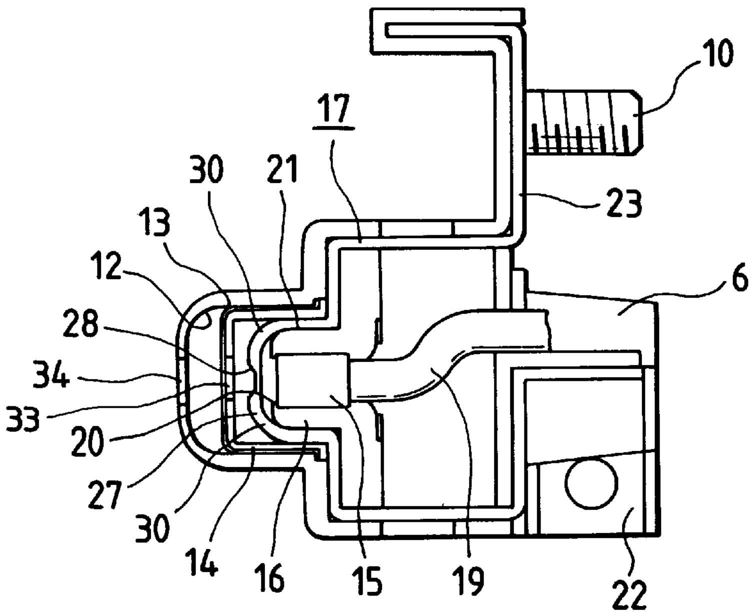
FIG. 8 is a front view of the third embodiment.
Figure 9:
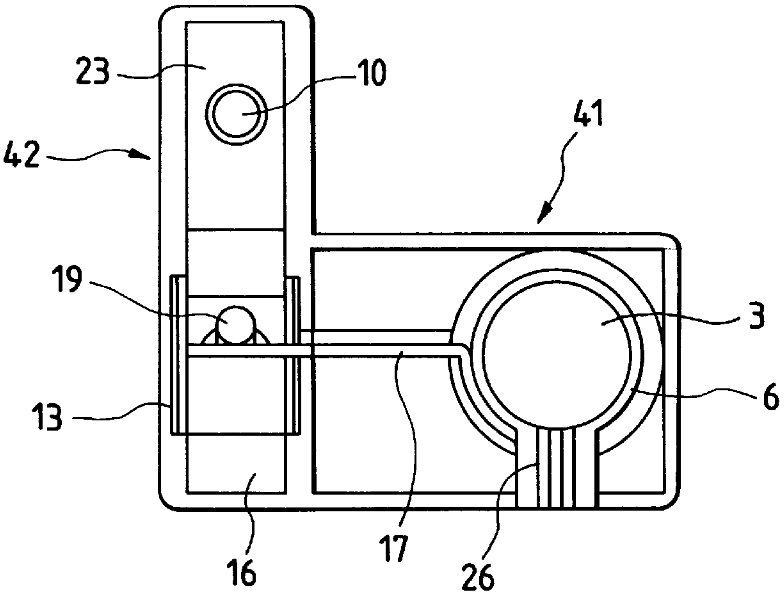
FIG. 9 is a plan view of the third embodiment.
Figure 10:
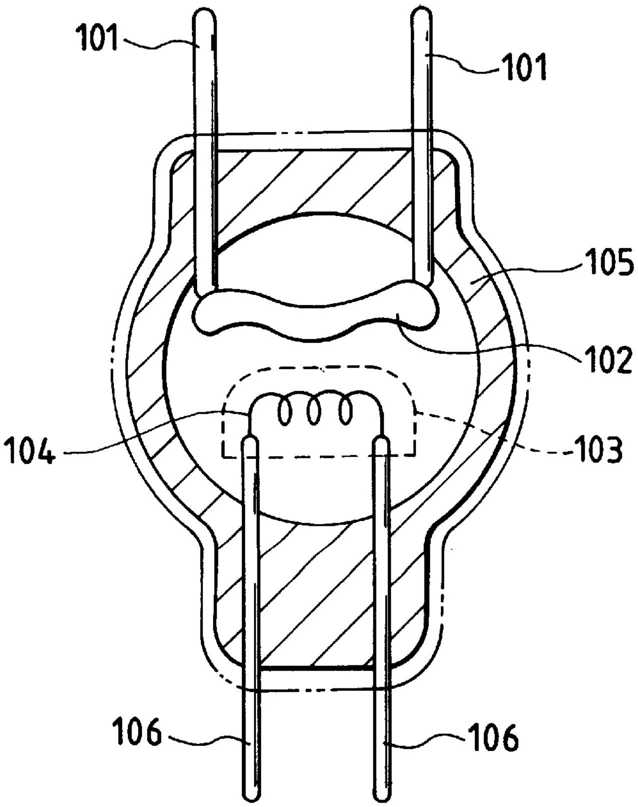
FIG. 10 is a cross-sectional view of a conventional example.

A third embodiment of the present invention will be described with reference to FIG. 8 and FIG. 9.

In the first embodiment described above, the circuit breaking device is provided onto a surface on which the battery post 3 of the battery is erected while a portion of the circuit breaking device is protruded outside.

On the other hand, in this third embodiment, the circuit breaking device is provided on both the surface on which the battery post 3 of the battery is erected and a surface adjacent to the above surface. Accordingly, it is easy to provide the circuit breaking device in accordance with a empty space around the battery.

In accordance with the above change in the structure, outer shapes of the housing and the bus bar are also changed. However, the essential function and arrangement are the same as those of the first embodiment described before. Therefore, like reference numerals are used to indicate like parts in the first and the third embodiment, and explanations are omitted here.

Therefore, the circuit breaking device of this third embodiment is described as follows:

A portion 41, in which the insertion hole 4 of the battery 3 is provided, and a portion 42, in which the casing 13 accommodating the explosive sealing portion 15 and the stud bolt 10 are provided, make a right angle with each other. Accordingly, the circuit breaking device of the third embodiment can be provided in such a manner that the circuit breaking device comes into contact with the surface on which the battery post 3 is erected and also with the surface adjacent to the above-mentioned surface.

It should be noted that the present invention is not limited to the above specific embodiments described above referring to the accompanying drawings. For example, the following embodiments are included in the technical scope of the present invention, and variations may be made by one skilled in the art without departing from the scope of the present invention.

The means for composing the easy broken portion of the electric conductor is not limited to the above embodiments, but it is possible to adopt a means in which perforations are made in the electric conductor.

As a feature of the display section, the display section may be colored differently from the surroundings. A position at which the display section is disposed may be any position as long as the display section can be visually checked from the outside when the lid is moved to the electric connection resetting position.

The spare bus bar is not necessarily fixed onto the lid beforehand. It is possible to store the spare bus bar at a different place.

In the above embodiment, the louver of low resistance is provided in the inserting portion of the spare bus bar, however, it is possible to provide the louver in the resetting portion of the bus bar.

It is possible to adopt an arrangement in which the spare bus bar is provided with a fuse, which is fused so as to shut off the circuit when an overcurrent generates in the case of a short circuit caused after the circuit has been connected again.

The present invention is applied to not only the electric power supply circuit of an electric automobile shown in the above embodiment but also a circuit which must be shut off in case of emergency and can be reset so that the circuit can be connected again.

What is claimed is:

1. A circuit breaking device comprising:

a housing for accommodating an explosive exploding in response to a trigger signal, said housing having an opening for directing an explosive force in one direction, said housing also having a vent hole from which a blast of explosion is released; and an electric conductor formed as part of a circuit within the circuit breaking device, the electric conductor including a frangible portion capable of being broken by explosive force so as to break the circuit, wherein the frangible portion is opposed to the opening and is broken solely by the explosive force without the explosive force without mechanism between the explosive and the frangible portion.

2. The circuit breaking device according to claim 1, wherein said frangible portion further comprises a cutout portion of said electric conductor, wherein the thickness of said electric conductor is thinned.

3. The circuit breaking device according to claim 1, further comprising a cutout portion provided at a side of said frangible portion for facilitating bending of a broken piece when said electric conductor is broken at said frangible portion.

4. The circuit breaking device according to claim 1, further comprising a restricting wall for restricting movement of said housing provided on a side opposite the opening for directing the explosive force in one direction.

5. The circuit breaking device according to claim 1, wherein said device further comprises, a resetting electric conductor by which both sides of a broken portion of said electric conductor can be reconnected to each other after said electric conductor has been broken.

6. The circuit breaking device according to claim 5, wherein further comprising a lid attached to a case, said resetting electric conductor is provided on said lid, said resetting electric conductor is not contacted with said electric conductor in said case when said lid is normally attached to said case, and said resetting electric conductor is contacted with both sides of said frangible portion of said electric conductor when said lid is shifted from a normal position.

7. The circuit breaking device according to claim 6, wherein said case is provided with a display section for displaying a resetting state of said circuit breaking device at a position capable of being visually checked from the outside when said lid is moved for resetting said circuit breaking device.

8. The circuit breaking device according to claim 1, wherein said circuit breaking device further comprises:

a fastening ring for fastening a battery post of a battery, said fastening ring electrically connecting said battery post to said electric conductor; and a stud bolt connected to a connection terminal of an electrical power supply wire, said stud bolt being electrically connected to said conductor.

9. The circuit breaking device according to claim 5, wherein said circuit breaking device further comprises:

a fastening ring for fastening a battery post of a battery, said fastening ring electrically connecting said battery post to said electric conductor; and a stud bolt connected to a connection terminal of an electric power supply wire, said stud bolt being electrically connected to said electric conductor.

10. The circuit breaking device according to claim 1, wherein said electric conductor is located between said explosive and said vent hole in the one direction, said vent hole releasing the blast of explosion after breakage of the frangible portion.

* * * * *